United States Patent

[11] 3,607,108

| [72] | Inventor | David Wayne Gehres |
| --- | --- | --- |
| | | Carlisle, Pa. |
| [21] | Appl. No. | 678,443 |
| [22] | Filed | Oct. 26, 1967 |
| [45] | Patented | Sept. 21, 1971 |
| [73] | Assignee | Aiken Industries, Inc. |
| | | c/o P. R. Hoffman Company, Division of |
| | | Aiken Industries, Inc., Carlisle, Pa. |

[54] SEED HOLDER AND GROWTH SUPPRESSOR ASSEMBLY FOR THE HYDROTHERMAL SYNTHESIS OF QUARTZ
6 Claims, 5 Drawing Figs.

[52] U.S. Cl........................................................ 23/273 R,
23/301 R, 248/451
[51] Int. Cl......................................................... B01j 17/22
[50] Field of Search............................................ 23/301,
273; 211/40, 41, 42, 88; 248/451

[56] References Cited
UNITED STATES PATENTS

| 2,119,407 | 5/1938 | Weiskoff...................... | 211/41 |
| 2,488,535 | 11/1949 | Hamburg...................... | 211/41 |
| 2,674,520 | 4/1954 | Sobek............................ | 23/301 |
| 2,900,074 | 8/1959 | Windman...................... | 211/41 |
| 3,291,575 | 12/1966 | Sawyer.......................... | 23/301 |

*Primary Examiner*—Norman Yudkoff
*Assistant Examiner*—R. T. Foster
*Attorney*—Sughrue, Rothwell, Mion, Zinn & MacPeak ABSTRACT: An assembly used for holding quartz seed plates and suppressing growth used in a hydrothermal process of synthetically growing quartz includes a pair of spaced and facing channels for holding flat ends of seed plates and a number of slidable growth suppressor plates held in the channels by tips thereon and extending transverse to the plane of the seed plates. The channels may have removable liners and may be double channels when there are multiple vertical tiers of seeds in an autoclave. A tang on the channel linear prevents the growth suppressor and seed plates from falling out of the channel.

PATENTED SEP 21 1971  3,607,108

INVENTOR
DAVID WAYNE GEHRES

BY Hughes, Rothwell, Mion, Zinn & Macpeak

ATTORNEYS

SEED HOLDER AND GROWTH SUPPRESSOR ASSEMBLY FOR THE HYDROTHERMAL SYNTHESIS OF QUARTZ

BACKGROUND

1. Field of Invention

This invention relates to improvements in the hydro thermal synthesis of quartz, and particularly to a unique arrangement for holding seed plates and suppressing growth in the crystallographic X-axis direction.

2. Prior Art

Hydrothermal synthesis of quartz has been known for many years and has presently been refined to the point where a substantial amount of quartz used for frequency control applications today is produced from synthetic or cultured quartz. In the commonly practiced commercial process for hydrothermal synthesis of quartz a vertical autoclave holds a supply of nutrient in a bottom portion thereof and is filled over half full with an aqueous solution containing sodium ions. The upper portion of the autoclave includes a number of Z-cut seed plates held in a seed rack. The autoclave is heated to increase the temperature and pressure sufficiently to cause growth of the quartz on the seed plates and is maintained in this condition for a number of days until rocks of sufficient size are grown on each of the seed plates in the seed rack.

A number of ways are known in the art for holding seeds in seed racks of various shapes and sizes. In one known arrangement, clips of bendable metal are placed on the ends of the seeds and portions of the clips are bent over horizontal supports in the seed rack. Another arrangement for holding seeds is to shape the ends of the seeds themselves either by removing a portion of the seed ends to provide an extending tang or by cutting a slot in the ends of the seed.

It is also known in the prior art to provide various arrangements of growth suppression plates. Foil sheets have been used for growth suppression as have pairs of plates positioned on both sides of a seed.

In all of the prior art arrangements for holding seeds and suppressing growth, various ones of the following problems have occurred. First of all, there is much labor involved in making the seeds ready for loading and for actually loading the racks. The operations where individual seeds have to be cut or processed to form their ends or individual holders have to be bent or assembled greatly increases the time and labor of preparing the seeds and loading the seed racks which commonly contain hundreds of seeds in multiple tiers.

Another problem occurs when the ends of the seeds are cut or ground away. This results in shortening the seeds which are usually elongated in the crystallographic Y direction and when such seeds are shortened, their length is forever lost for all practical purposes since growth in the crystallographic Y direction is very slow. It is desirable to have seeds long in the crystallographic Y direction for the purpose of fabricating blanks from the resulting rocks with a minimum of subsequent mechanical handling and processing.

Another problem encountered with some of the prior art arrangements is that of seeds moving during the hydrothermal synthesis when the autoclave is closed and under high temperature and pressure. If the seeds get cocked within their seed holders, they will be mispositioned and at the end of the growth cycle adjacent rocks will have grown into one another destroying the value of both rocks and resulting in defective quartz.

Another problem involved with the prior art results in thermal expansion of the metallic components from which the seed holders and growth suppressors are fabricated. Due to the rise in temperature from the time the seed rack is loaded and inserted into the autoclave until and through the hydrothermal synthesis and growth cycle, the metal will expand and contract and if it is rigid with the quartz seeds or rocks will place such forces on the quartz as to cause cracking and defective quartz.

A further problem in prior art holders for quartz as well as growth suppressors is growth of the quartz over the holders or growth suppressors making it very difficult if not impossible to unload quartz from the rack after the rocks have grown without cracking the quartz.

An additional problem encountered in the prior art is that of autoclave space. Since autoclaves are expensive capital equipment and since the length of the growth cycle is measured in weeks or months, it is essential that the space within the autoclave be used as effectively and economically as possible. Many of the prior art arrangements were quite wasteful of this valuable space.

SUMMARY OF THE INVENTION

This invention provides an assembly for holding seed plates and suppressing growth in a hydrothermal quartz synthesis process in which the ends of the seed plates need not be cut or ground to a special shape but in fact are flat, and the seeds are held loosely so thermal expansion does not create any forces on the seeds or grown rocks. Since the ends of the seeds are not deformed there is no shortening of the seeds in the growth of quartz. The seeds and growth suppressors may be quickly and easily loaded without any special training or need for skilled labor, and the assembly is constructed so that there would be no growth of quartz over the seed holders. Growth suppressor plates will suppress growth of quartz in the crystallographic X direction between adjacent seeds producing rocks which are very suitable for processing of synthetic quartz into blanks for frequency control applications. The assembly is such that the autoclave space is economically used and that the number of growth suppressor plates is only one more than the number of quartz seeds. Furthermore, the seed plates are held in channels and positively prevented from cocking thus eliminating the problem of one seed growing into an adjacent seed.

The foregoing is accomplished by an assembly which holds rectangular plate-shaped seeds between a pair of vertically spaced elongated channel members having a channel width to accommodate the width of the seed plates and hence hold the seed plates at their ends. The channel members are vertically spaced by a fixed member. A number of growth suppression plates (one more than the number of seeds) are inserted in the channels with the plane of the plates extending transverse to the plane of the seeds and in alternate arrangement with the plates. The seeds and plates are prevented from coming out the end of the channel and are loose therein to allow for thermal expansion and easy loading and unloading. Each channel may have a removable lining and for vertical tiers of seeds the channels may have double faces. There may be several channel assemblies within an autoclave to utilize the space in a most economical manner.

DESCRIPTION OF PREFERRED EMBODIMENT

Figure 1:
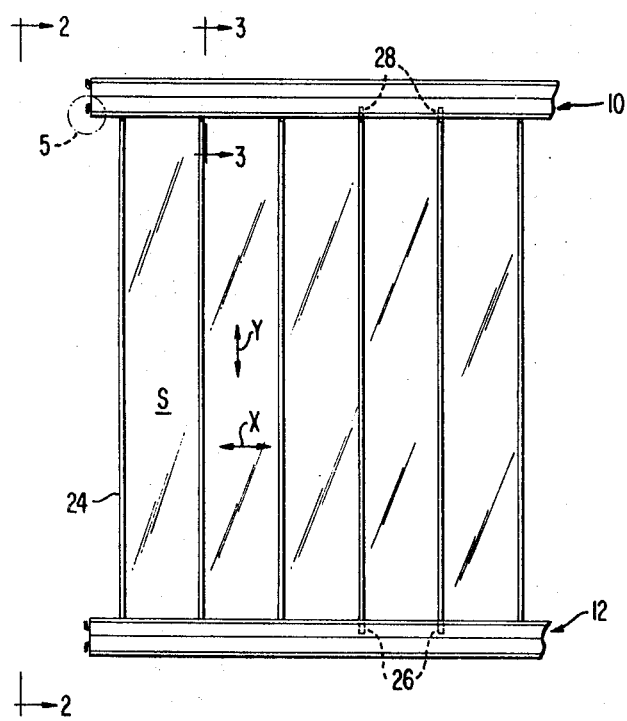
FIG. 1 is a side elevation view of a seed holder and growth suppressor assembly of this invention.
Figure 2:
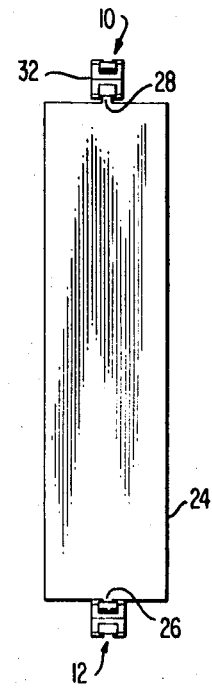
FIG. 2 is an end elevation view looking along line 2—2 of FIG. 1.

Referring to the drawing, the seed holder and growth suppressor assembly of this invention includes a pair of spaced apart channel members 10 and 12, see FIGS. 1 and 2. These members are in pairs and are vertically spaced apart within a vertical autoclave A, FIG. 4. Since each channel member is identical, only one will be described in detail.

Figure 3:
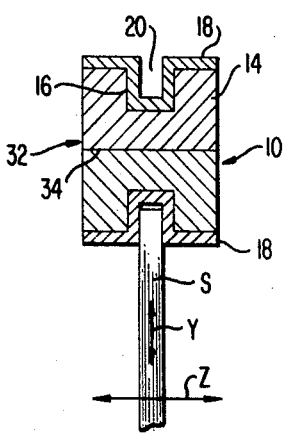
Fig. 3 is a detailed sectional elevation view taken along line 3—3 of FIG. 1.

Each channel member includes an elongated body 14 having a groove 16 extending longitudinally thereof. The body 14 has a removable liner 18 formed to conform to one face of the body including extending into groove 16. The liner thus creates a channel opening 20 extending the length of the channel member. The width of the channel opening is slightly greater than the width of a seed plate S used in the hydrothermal synthesis of quartz and will hold the seed plate therein, see FIG. 3. The seed plate may be of the type having a rectangular surface with its length extending in the crystallographic Y direction, its width in the crystallographic X direction, and its thickness in the crystallographic Z direction. The channels 20 hold both the top and bottom flat ends of the seed plate by engaging the seed plate on the faces adjacent these ends.

Figure 4:
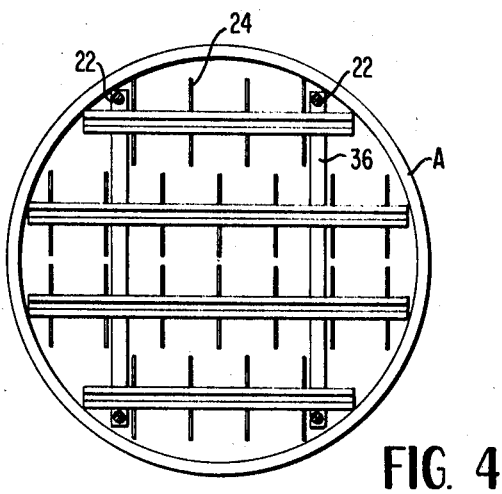
FIG. 4 is a horizontal sectional view taken transversely through a vertical autoclave showing the assembly of this invention therein.
Figure 5:
FIG. 5 is a detail view of the end of one of the channel members enlarging the area indicated 5 in FIG. 1 and showing it partially in section.

The channel members 10 and 12 are fixedly vertically spaced by a suitable vertical spacing member 22 shown in section in FIG. 4. Of course, any suitable vertical spacing member or arrangement could be used.

A plurality of growth suppressor plates 24 have a body portion with a length equal to the length between the channel members 10 and 12 and include tips 26 and 28 extending outwardly of the ends of the length of the suppressor plate. The tips 26 and 28 are of the size and shape to fit within channel 20 of members 10 and 12. The width of growth suppressor plates 24 is equal to or greater than the width of the rock which will be grown on the seed S in the crystallographic Z direction.

The number of growth suppressor plates is one more than the number of seeds S used between two channels 10 and 12. The growth suppressor plates 24 are assembled so that a seed is between each growth suppressor plate and a growth suppressor plate is at each end of the channel, see FIGS. 1 and 4.

Since autoclaves are commonly comparatively long and seeds are commonly comparatively short, there are usually a number of tiers of seeds in a seed rack positioned in the upper portion of the autoclave. The construction of this invention is admirably suited to a multiple-tier seed rack with growth suppressor plates. In such a construction there is a double channel 32 in which two identical channel bodies 14 may be joined back to back along their backfaces 34 or in which a single body member may be provided having opposed grooves 16 therein for accommodating opposed liners 18.

For preventing the slidable seeds and growth suppressor plates from sliding out the ends of the channels a tang 30 is provided at the end of the bottom of each channel liner 18 and is bendable downwardly to prevent the assembly from sliding out and bendable upwardly when unloading.

Due to the relatively large diameter of autoclaves presently used and to provide for economical use of the space of the autoclave a number of assemblies such as described should be positioned side by side as well as in vertical tiers. This side by side positioning may be accomplished by horizontal connecting members 36, FIG. 4, which provides the horizontal connections between the channels with the vertical connections provided by the vertical spacing members 22.

It is believed that the operation of the invention will be apparent from the foregoing but a brief resume will now be given. In the conventional process for hydrothermal synthesis of quartz a supply of nutrient is positioned in a basket in the lower portion of a vertical autoclave A, the autoclave is filled over half full with an aqueous solution containing sodium ions, and a number of Z-cut seed plates are held in the upper portion of the autoclave. The autoclave is closed and heated to a desired temperature and pressure and held at that temperature and pressure for a number of days. Using this invention, the seeds are assembled in a seed rack by first putting in one growth suppressor plate 24 then sliding one seed in the channel, then another growth suppressor plate etc. until each pair of channels of the seed rack are full. The growth suppressor plates abutting the X-axis surfaces of the seed plate and suppressing growth in the X direction.

The seed rack is loaded into the autoclave after tang 30 is bent down to prevent the seeds and the growth suppressor plates from falling out, the autoclave is closed and during the hydrothermal synthesis the seeds are prevented from cocking while any expansion can be taken care of by the sliding of the seed plates and racks. The X growth will be suppressed by the plates 24 and since quartz grows very little in the Y direction and the Y ends are held in the channel members 10 and 12, the entire growth on the seed will be in the crystallographic Z direction. Quartz will grow relatively fast on both Z faces of the seed and a rock well suited for cutting blanks will result. After a number of days the autoclave is opened, the seed rack is removed, tangs 30 bent up and the growth suppressor plates and rocks which are grown on the seed can be slid out by sliding the entire channel liner 18 out of the body 14. Then, the rocks can be gently removed from the liners and processed as is known in the art into quartz oscillator blanks. If desired, the seeds can be saved during the cutting and processing of the grown rock and reused.

While the invention has been particularly shown and described with reference to preferred embodiments thereof, it will be understood by those skilled in the art that various changes in form and details may be made therein without departing from the spirit and scope of the invention.

What is claimed is:

1. A seed holder and growth suppressor assembly in combination with a plurality of Z-cut rectangular plate-shaped quartz seeds having crystallographic X-, Y- and Z-axes, the X- and Y-axes of all the seeds being in the same plane, the assembly suppressing growth on the crystallographic X-axis of each seed during hydrothermal synthesis of quartz within a vertical autoclave, and comprising: a pair of vertically spaced elongated channel members, each having a longitudinal channel of width to accommodate the width of the seed plates in the crystallographic Z-axis direction and hence hold the seed plates at their ends within the plane of the channel, a vertical spacing member fixedly holding channel members a predetermined distance apart with the channels facing each other to accommodate the length of the seed plates, a plurality of separate and removable growth suppressor plates each having a length equal to the spacing between the spaced channels and a tip on each end of a size and shape to be slidable in the channel members, there being a number of growth suppressor plates one greater than the number of seeds held between the pair of channels, the growth suppressor plates and seeds assembled in alternate relation with the plane of the seed plates within the plane of the channel and the plane of the growth suppressor plates transverse to the plane of the seed plates, the channel members, spacing members, and growth suppression plates formed of a material capable of withstanding high temperature, high pressure and alkaline conditions which occur in the autoclave during hydrothermal synthesis of quartz and means to prevent the seeds and growth suppressor plates from sliding out the ends of the channels.

2. An assembly as in claim 1 wherein each channel member includes a removable channel lining.

3. An assembly as in claim 2 wherein there are at least two vertically related pairs of channel members in juxtaposition so that at least the common central channel member has channels on both opposite vertical surfaces thereof.

4. An assembly as defined in claim 3 wherein there are at least two pairs of horizontally related channel members and further comprising members fixedly connecting and horizontally spacing the channel members.

5. An assembly as defined in claim 4 wherein means to prevent the seeds and growth suppressor plates from sliding out the ends of the channels includes a bendable tang extending from the end of the removable liner.

6. In a process for hydrothermal synthesis of quartz of the type including positioning a supply of nutrient in a lower portion of a vertical autoclave, holding a plurality of Z cut seed plates in an upper portion of the autoclave, filling over half the autoclave with an aqueous solution of sodium ions, and heating the autoclave for a period of time sufficient to cause growth of quartz on the seeds under conditions of high temperature and pressure, improvements in holding the seeds and suppressing X growth thereon during the hydrothermal synthesis of quartz, the improvements comprising; loosely holding the ends of each seed plate within channels contacting the faces of each seed plate adjacent each end, positioning a number of freely slidable growth suppressor plates in the channel alternate to the positioning of the seed plates to abut the seed plates on the X edge surfaces thereof, the plane of the growth suppressor plates extending transverse to the plane of the seed plates, the number of growth suppressor plates being one greater than the number of seed plates in the channels, and preventing the freely slidable growth suppressor plates and seed plates from sliding out the end of the channel.